Patented Feb. 3, 1931

1,790,794

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

METHOD OF TREATING RUBBER

No Drawing.   Application filed September 17, 1929.   Serial No. 393,313.

This invention relates to a method of treating rubber for imparting age-resisting qualities thereto, and to the resulting rubber products. More particularly, it is concerned with the incorporation with rubber of certain types of compounds formed by the reaction of primary aromatic amines, formaldehyde and phenolic compounds.

It is generally accepted that the rate of deterioration of rubber articles differs greatly, depending upon various factors, among the most important of which is the composition of the stock. Various materials have heretofore been incorporated in rubber stocks to inhibit deterioration, including the condensation products of aldehyde with amines. However, most of these agents are open to the objection that they affect the rate of cure of the rubber when added to rubber stock containing a vulcanizing agent and an accelerator.

The primary object of this invention, therefore, is to provide a method for retarding the deterioration of rubber by the use of materials which cause practically no retardation in the curing operation.

With this object in view we have now discovered the adaptability for use as age-retarding agents of a class of compounds not hitherto employed for this purpose.

The new agents may be obtained by reacting an aromatic primary amine, formaldehyde and a phenolic compound as described in German Patent 109,498. The resulting products are mixtures containing, in each instance, as the major constituent, a hydroxy benzyl aryl amine having the general formula.

in which formula R represents an aryl group which may or may not contain alkyl substituents and R' represents an aryl group which may or may not contain alkyl and alkoxy substituents.

In order to disclose the preparation and manner of use of the above described compounds as anti-aging agents, the following example of the preparation and use of a particular compound is submitted. It is to be understood, however, that this example is furnished purely for purposes of illustration and that it is not intended that applicants be limited to the particular reagents, proportions, or conditions therein specified which are susceptible of wide variation within the scope of the appended claims:

Example 1

626 gms. 100% sodium bisulfite as a 35% solution are charged into a reaction kettle and 180 g. 100% formaldehyde as a 32-37% solution are added as rapidly as possible. The temperature should rise to 50° C. or higher. This mixture is agitated for ½ hour and cooled (if necessary) to 50°. 560 gms. aniline are added during 15 minutes which should cause the temperature to rise to at least 60° C. Agitation is continued for 1½ hours after the maximum temperature is reached. The charge is then cooled to 20° C., 560 g. salt (sodium chloride) added, agitation continued for one hour, and filtered. The cake is digested with a solution of 560 g. salt in 1680 cc. cold water for one hour and filtered. The filter cake is then added to a solution of guaiacol in 80% sulfuric acid. The mixture is then heated to eliminate sulfur dioxide. When the elmination of sulfur dioxide is complete the charge is diluted, cooled, and filtered, from a small amount of tarry matter. Sodium chloride is added which causes the precipitation of the hydrochloride of the new base. The hydrochloride is filtered off and converted to the free-base in the usual manner, by treatment with an alkali, such as sodium carbonate. The oily free-base is separated, dried and may be used directly as an antioxidant for rubber.

The resulting product, although a mixture, as noted above, contains as the major constituent 4-hydroxy-3-methoxy benzyl aniline

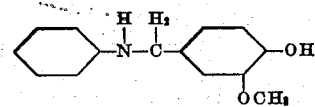

In order to test the anti-aging properties of this compound two stocks were made up of the following compositions. The proportions given are in terms of weight:

|  | Stock A | Stock B |
|---|---|---|
| Smoked sheet | 100 | 100 |
| Zinc oxide | 18.15 | 18.15 |
| Sulfur | 2.75 | 2.75 |
| D. O. T. G | .5625 | .5625 |
| Mixture prepared as above | 0.0 | 2.5 |

The stocks were cured for 35 minutes at 40 lbs. steam pressure and thereupon aged in an oxygen bomb at 70° C. and 300 lbs. oxygen pressure. The time required for the complete deterioration of stock A was three days and that for stock B was 14 days. The above result clearly establishes the peculiar value of this compound when employed as an antioxidant.

In addition to the compound employed in the example, many other products which are obtained similarly by the reaction of aromatic primary amines, formaldehyde, and phenolic compounds and which have as their major constituent the hydroxy benzyl aryl amines having the general formula indicated above, may be employed. Thus, in place of aniline, the toluidines, as ortho-, meta-, and para-toluidines; the xylidines; the anisidines, the phenetidines and the naphthylamines may be used to obtain effective age-retarding compounds. In place of guaiacol, other phenols such as phenol itself; ortho- or meta-cresol; resorcinol monomethyl ether; 1:3-pyrogallol dimethyl ether; creosole, etc., may be used. A number of such compounds having similar anti-aging characteristics are listed below, for purposes of illustration.

(1) m-Hydroxy-benzyl-aniline

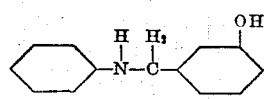

(2) o-Hydroxy-benzyl-aniline

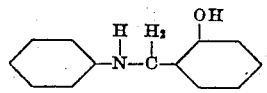

(3) p-Hydroxy-benzyl-aniline

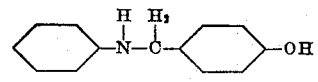

(4) p-Hydroxy-benzyl-p-methyl-phenyl-amine

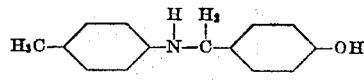

(5) o-Hydroxy-benzyl-p-methyl-phenyl-amine

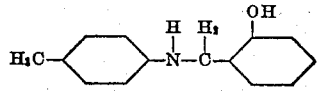

(6) Phenyl-6-hydroxy-3-methyl-benzyl-amine

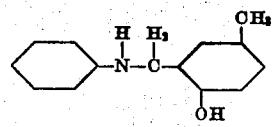

(7) p-Hydroxy-benzyl-beta-naphthyl-amine

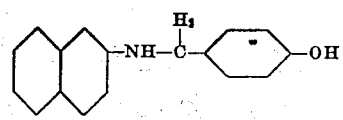

Obviously many other compounds of the type listed above may be employed. Moreover, it is obvious from the listed compounds that the presence of alkyl substituents in the aryl nuclei does not materially alter their value as antioxidants and that the phenolic nuclei may contain an alkoxy group or groups in lieu of, or in addition to, the hydroxy group. Furthermore, it is obvious that naphthyl or diphenyl groups may be substituted for either one or both phenyl groups without greatly affecting the properties of the compounds. Of the compounds described however, by reason of their ease of preparation and unusual effectiveness, those compounds wherein R and R' both represent phenyl groups are preferred and, of them, in particular 4-hydroxy-3-methoxy-benzyl-aniline represents the preferred embodiment.

The new agents may be incorporated into the rubber by any well known means, such as by milling them into the stock upon the rolls of an ordinary mill prior to vulcanization. In the specific example given above, the agent was so incorporated.

Moreover, it is often advantageous to treat vulcanized rubber with agents adapted to improve its aging properties. The group of agents herein described has been found to be particularly useful for this purpose and such agents may be incorporated with the vulcanized rubber, for example, by immersing the latter in a solution of the agent. Treatment of vulcanized rubber with vapors of compounds of this class will also improve its resistance to deterioration.

Moreover, the agents described herein may be employed in various rubber compounds and rubber substitutes, such as for example, gutta percha, balata and synthetic rubber. It is, therefore, to be understood that the invention is not limited to any particular rubber stock or rubber compound.

Also, the proportions of the agent employed may be varied within wide limits, although under ordinary circumstances from 1 to 5% of the agent, based on the weight of the rubber content of the stock treated and depending upon the protection desired and the conditions of exposure to be met, has been found to be highly satisfactory.

As many apparent and widely different embodiments of this invention may be made without departing from the spirit and scope thereof, it is to be understood that we do not limit ourselves to the specific embodiments thereof except as defined in the appended claims.

We claim:

1. The process of increasing the resistance of rubber to deterioration which comprises incorporating with the rubber a compound having the general formula

wherein R represents an aryl group which may contain an alkyl substituent or substituents, and R' represents an aryl group which may contain an alkyl or alkoxy substituent or substituents.

2. The process of increasing the resistance of rubber to deterioration which comprises incorporating with the rubber a product prepared by reacting an aromatic primary amine with formaldehyde and sodium bisulfite, reacting the resulting omega salt with a phenolic compound, heating to eliminate sulfur dioxide, precipitating the hydrochloride of the resulting base and treating the precipitate with an alkali.

3. The process of increasing the resistance of rubber to deterioration which comprises incorporating with the rubber from 1 to 5% of 4-hydroxy-3-methoxy-benzyl-aniline.

4. The process of increasing the resistance of rubber to deterioration which comprises incorporating with the rubber a product prepared by reacting aniline with formaldehyde and sodium bisulfite, reacting the resulting omega salt with guaiacol, heating to eliminate sulfur dioxide, precipitating the hydrochloride of the resulting base and treating the precipitate with sodium carbonate to obtain the free-base.

5. The process of increasing the resistance of rubber to deterioration which comprises incorporating with the rubber a vulcanizing agent and a compound having the general formula R—NH—CH$_2$—R'—OH, wherein R represents an aryl group which may contain an alkyl substituent or substituents and R' represents an aryl group which may contain an alkyl or alkoxy substituent or substituents, and thereafter vulcanizing.

6. The process of increasing the resistance of rubber to deterioration which comprises incorporating with the rubber a vulcanizing agent and a compound prepared by reacting an aromatic primary amine with formaldehyde and sodium bisulfite, reacting the resulting omega salt with a phenolic compound, heating to eliminate sulfur dioxide, precipitating the hydrochloride of the resulting base, treating the precipitate with an alkali, and thereafter vulcanizing.

7. The process of increasing the resistance of rubber to deterioration which comprises incorporating with the rubber a vulcanizing agent and a compound having the general formula set forth in claim 1 wherein the radical R' contains an alkoxy substituent, and thereafter vulcanizing.

8. The process of increasing the resistance of rubber to deterioration which comprises incorporating with the rubber a vulcanizing agent and a compound prepared by reacting aniline with formaldehyde and sodium bisulfite, reacting the resulting omega salt with a phenolic compound, heating to eliminate the sulfur dioxide, precipitating the hydrochloride of the resulting base, treating the precipitate with an alkali, and thereafter vulcanizing.

9. The process of increasing the resistance of rubber to deterioration which comprises incorporating with the rubber a vulcanizing agent and a compound prepared by reacting an aromatic primary amine with formaldehyde and sodium bisulfite, reacting the resulting omega salt with guaiacol, heating to eliminate sulfur dioxide, precipitating the hydrochloride of the resulting base, treating the precipitate with an alkali, and thereafter vulcanizing.

10. The process of increasing the resistance of rubber to deterioration which comprises incorporating with the rubber a vulcanizing agent and 4-hydroxy-3-methoxy-benzyl-aniline and thereafter vulcanizing.

11. The process of increasing the resistance of rubber to deterioration which comprises incorporating with the rubber a vulcanizing agent and a product prepared by reacting aniline with formaldehyde and sodium bisulfite, reacting the resulting omega salt with guaiacol, heating to eliminate sulfur dioxide, precipitating the hydrochloride of the resulting base, treating the precipitate with sodium carbonate to obtain the free-base, and thereafter vulcanizing.

12. Rubber having incorporated therewith a compound having the general formula R—NH—CH$_2$—R'—OH, wherein R represents an aryl group which may contain an alkyl substituent or substituents, and R' represents an aryl group which may contain an alkyl or alkoxy substituent or substituents.

13. Rubber having incorporated therewith a product prepared by reacting an aromatic primary amine with formaldehyde and sodium bisulfite, reacting the resulting omega salt with a phenolic compound, heating to eliminate sulfur dioxide, precipitating the hydrochloride of the resulting base and treating the precipitate with an alkali.

14. Rubber having incorporated therewith from 1 to 5% of 4-hydroxy-3-methoxy-benzyl-aniline.

15. The process of increasing the resistance of rubber to deterioration which comprises incorporating with the rubber from 1 to 5% of p-hydroxy-benzyl-p-methyl-phenylamine.

16. The process of increasing the resistance of rubber to deterioration which comprises incorporating with the rubber from 1 to 5% of p-hydroxy-benzyl-beta-naphthylamine.

17. Rubber having incorporated therewith from 1 to 5% of p-hydroxy-benzyl-p-methyl-phenylamine.

18. Rubber having incorporated therewith from 1 to 5% of p-hydroxy-benzyl-betanaphthylamine.

In testimony whereof we affix our signatures.

WILLIAM S. CALCOTT.
WILLIAM A. DOUGLASS.